FIG. I.

2,952,674
Patented Sept. 13, 1960

2,952,674
METHOD FOR THE SELECTIVE EXTRACTION OF WATER SOLUBLE COMPLEX MIXTURES OF BIOLOGICALLY ACTIVE FLAVONOID SUBSTANCES

A. Jay Merritt, New Rochelle, and Louis Freedman, Bronxville, N.Y., assignors to U.S. Vitamin Corporation, a corporation of Delaware Filed Aug. 8, 1958, Ser. No. 753,959

12 Claims. (Cl. 260—210)

This invention relates to a process for the selective extraction of water-soluble complex mixtures of normally less water-soluble or water-insoluble biologically active flavonoids from plant material, and particularly from citrus fruits.

Flavonoid substances are reported in the scientific literature to be of therapeutic value for the treatment of a wide variety of physiological disorders associated with abnormal permeability and fragility of the capillary blood vessels. Thus, flavonoid substances are stated to be beneficial in the treatment of conditions such as spontaneous abortion, purpura, diabetic retinopathy, arthritis, virus infections, and the like.

Convenient sources of the flavonoid substances are the citrus fruits; the whole fruit, juice, peel, or the wastes therefrom, such as the press liquor or citrus molasses, accumulating in the processing of citrus fruits, may serve as practical sources.

More than one flavonoid substance may occur in the same fruit, and although the flavonone glycosides, hesperidin and naringin, are considered to be the most common, others, some as yet unidentified, are present and comprise the glycosides and aglycones of flavones, flavonols, flavanones, and flavanonols. Other substances, related chemically to the flavonoids, such as catechins and coumarins, are known to be present. The following identified flavonoids have been known to occur in citrus fruits; hesperidin, naringin, diosmin, neo-hesperidin, eriodictin, tangeretin, nobiletin and catechin.

It is known that complex mixtures of flavonoid substances can be water soluble despite the fact that the individual flavonoid components thereof, taken alone, are insoluble or only slightly soluble in water. The water solubility is unique, and thus derives from their association in admixture. The separation of the water-soluble mixtures from their naturally occurring impurities is highly desirable, because the water solubility is useful in pharmaceutical and therapeutic applications, but the recovery processes heretofore known have not utilized this bivalence in solubility in a fully effective way. The water-soluble complex mixtures have been isolated but only in an impure condition, as a result of which the products have been low in biological activity, and have also shown undesirable instability and hygroscopicity.

Flavonoid substances have been obtained from aqueous or alcoholic extracts of citrus fruit materials by precipitation as their heavy metal, alkaline earth metal, or alkali metal salts, followed by decomposition of the salts to recover the flavonoids. Such procedures require complicated numerous precipitations and reprecipitations, and the products thus obtained invariably contain appreciable amounts of non-flavonoid material coprecipitated therewith by the metal reagents.

Citrus fruits and alcoholic extracts therefrom, after removal of the alcohol, have been subjected to extraction with two organic solvents, using a higher molecular weight ester such as ethyl benzoate which dissolves the ballast or non-flavonoid substances and a lower molecular weight ester such as ethyl acetate to dissolve the desirable flavonoid substances. These single-phase solvent extractions require large quantities of solvents, and are thus cumbersome to handle, and repeated separations, extractions and distillations are necessary to obtain an impure product of low biological activity. The impure products thus obtained are unstable, hygroscopic powders.

The object of the invention is the selective extraction of a water-soluble complex of biologically active flavonoid substances from aqueous or alcoholic concentrated extracts of flavonoid-containing material such as those derived from citrus materials.

A further object of the invention is the preparation of a water-soluble complex of flavonoid substances which is substantially free from undesirable impurities, such as carbohydrates, tannins and phlobaphenes.

Still another object of the invention is the preparation of a water-soluble complex of flavonoid substances, which is stable and non-hygroscopic, and which has exceptionally high biological activity, thus making it eminently suitable for pharmaceutical and therapeutic uses.

An additional object of the invention is the obtention of the water-soluble flavonoid substances in substantially greater yields than have hitherto been possible by extraction processes.

In accordance with the invention, concentrated aqueous solutions or dispersions of flavonoid substances are subjected to a selective extraction as one phase in an initially three phase system simultaneously with two additional, separate solvent phases, water and n-butyl alcohol. The extraction is desirably carried out countercurrently, and preferably continuously, although batch extractions also are contemplated and give fully satisfactory results. By utilizing water and n-butyl alcohol together but as separate phases, it is possible to take advantage of the bivalence in solubility of the desirable flavonoid substances, so that, due to their low solubility or insolubility in water, they are preferentially extracted by the n-butyl alcohol phase, and in this way separated from their more water-soluble impurities, which are more soluble in, and therefore preferentially extracted by, the water phase.

In the course of the extraction process when carried out in a continuous flow system, the aqueous concentrate of flavonoid substances used as a starting material may and usually does eventually merge with the water phase, so that it would be equally proper to state in this case that the non-flavonoid substances are retained in the water phase, although undoubtedly extraction from the concentrate into the separate water phase may occur initially. The merger has the advantage that at the conclusion of the process there are only two phases to be separated.

It is essential that the butyl alcohol be saturated with water and the water saturated with butyl alcohol prior to contact with the feed material. This prevents absorption into the butyl alcohol phase of water solution containing non-flavonoid substances, which would thus decrease the degree of purity of the mixture of flavonoid substances, and it also prevents loss of flavonoid substances by absorption of butyl alcohol solution containing such substances into the water phase.

The process is best carried out countercurrently, passing the n-butyl alcohol extracting phase countercurrently to the water extracting phase, and with the feed material containing the flavonoid substances interposed at any point in the system, such that it is thoroughly mixed with the two extracting solvents.

The drawings represent schematically two types of countercurrent extraction.

Figure 1:
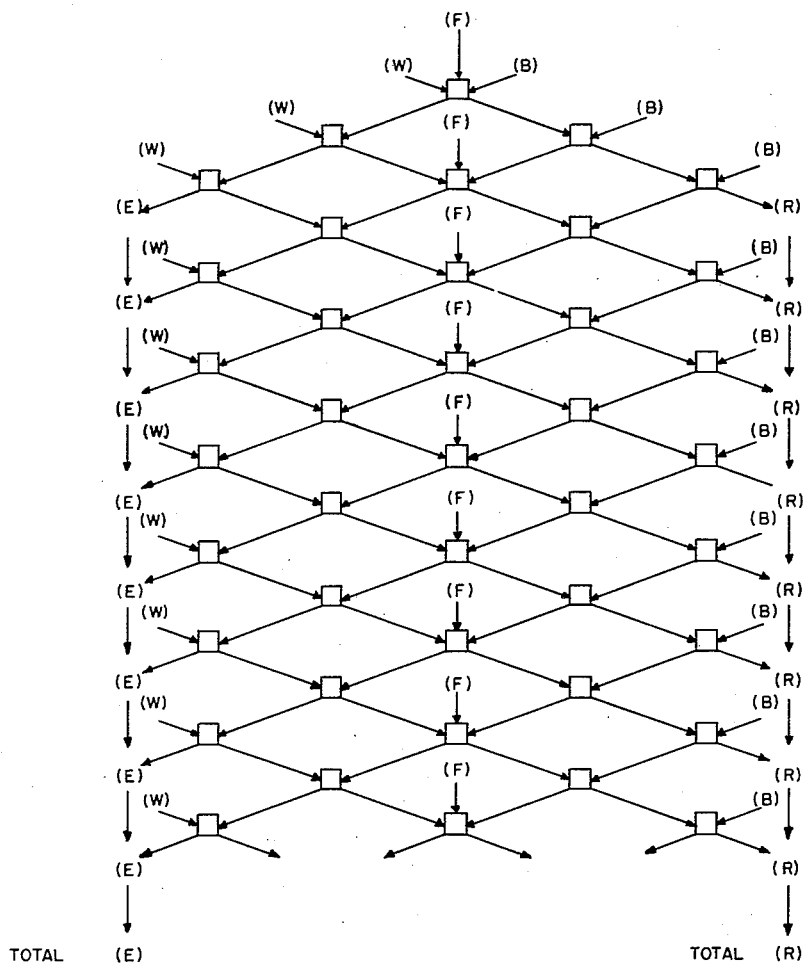
Fig. 1 is a schematic representation of a batchwise fractional liquid-liquid countercurrent extraction in accordance with the invention.

The n-butyl alcohol extract phase, as stated, contains the desired water-soluble complex of flavonoid substances. These are recovered by evaporation or distillation of the butyl alcohol, and the resulting residue can be dried using suitable apparatus, such as by spray-drying or under vacuum.

The powdered product obtained by direct drying of the residue after removal of the butyl alcohol is solvated with butyl alcohol, and as a result, has a low melting point, approximately 60° C., and is hygroscopic.

The invention also provides a special procedure for the preparation of the water-soluble complex of flavonoid substances as a stable, non-hygroscopic powder. These characteristics are obtained by dissolving the butyl alcohol solvated residue in water and concentrating the aqueous solution to a solids content of from about 25 to about 30%, in the course of which the butyl alcohol of the solvated product is removed azeotropically with the water. Sufficient water is added to ensure the removal of all the butyl alcohol in azetropic proportion. The residue which is recovered is then dried, and the powder obtained has a high melting point, above about 110° C., and is non-hygroscopic.

The process of the invention is applicable to any flavonoid-containing source of material, and many of those are known to those skilled in the art. The best sources are waste materials derived from citrus fruits. Citrus molasses, preferably free from suspended solids, is the preferred form. Citrus molasses is the by-product of the citrus industry, and is usually obtained by flash evaporation of the press liquor obtained from limed citrus peel and pulp, and is an important product in the processing of cannery wastes and citrus wastes for animal feed purposes. Citrus molasses is a fairly viscous material, and is present as a third phase during the first part but not all of the continuous three-phase selective extraction of the invention. The press liquor itself before evaporation can also be used, although this is less concentrated, and gives a less complete extraction. This material has a very low viscosity, approaching water, and may merge with the aqueous phase in the selective extraction very early in the continuous extraction, but this does not disadvantageously affect the course of the extraction.

The process of the invention preferably includes a multiplicity of mixing and separating stages, so that the feed is subjected to at least two and preferably three or more extractions. In the batchwise process, the phases after separation in each extraction are contacted in the next stage with fresh feed material, or with fresh water phase, or with fresh butyl alcohol phase. In the schematic drawing shown in Fig. 1, the feed is represented by F, the n-butyl alcohol phase (saturated with water) by B, the water phase (saturated with n-butyl alcohol) by W, the extract n-butyl alcohol (saturated with water) phase by E, and the aqueous raffinate (saturated with n-butyl alcohol) by R. Each square represents one combined extraction and separation operation. The process shown in the drawing involves 9 extractions of the feed, and two supplemental extractions of each extract phase and of each raffinate phase, respectively, following the initial contact with feed. The extracts and raffinates are collected, the extracts are purified by removal of butyl alcohol and if desired by processing to release solvated butyl alcohol, and the raffinates can be treated to obtain the non-flavonoid substances or can be discarded as desired.

Figure 2:
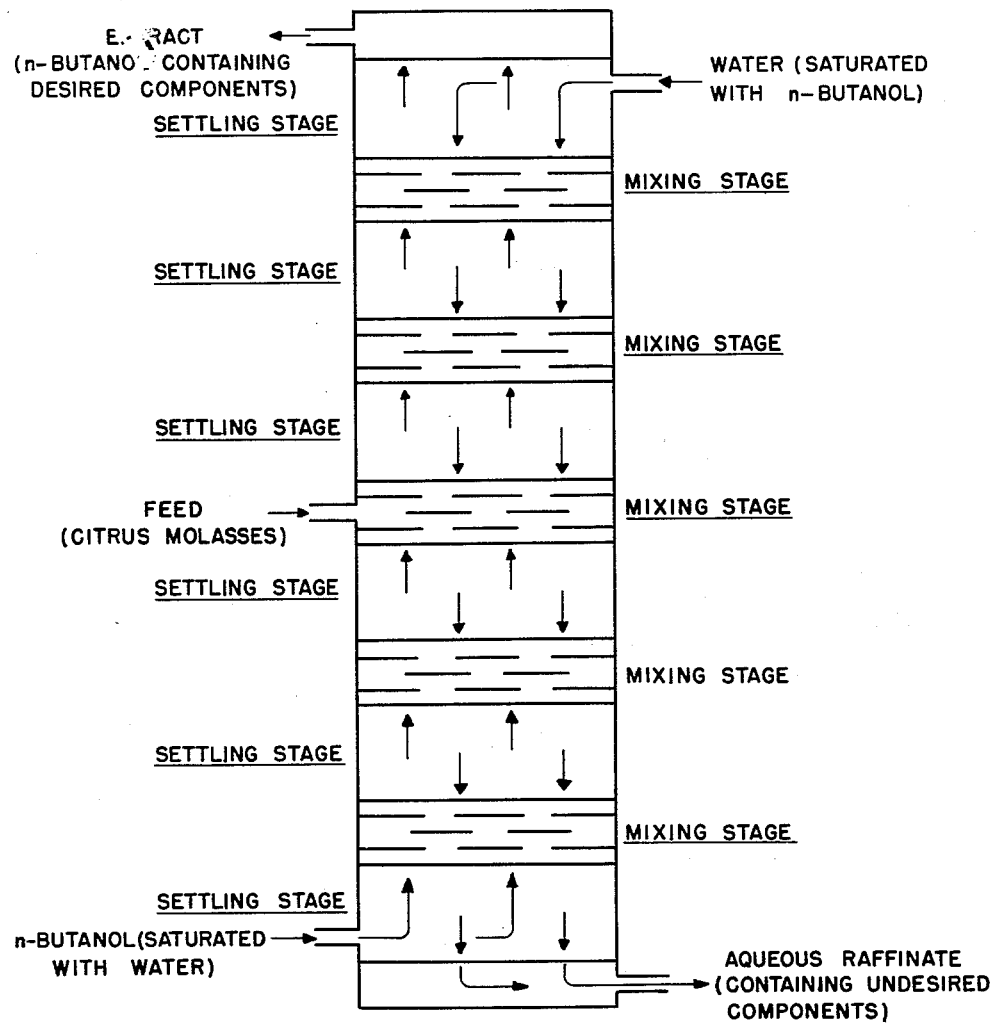
Fig. 2 is a schematic representation of a continuous fractional liquid-liquid countercurrent extraction in accordance with the invention.

In a continuous countercurrent extraction, such as is shown schematically in Fig. 2, the water phase is flowed countercurrently to the butyl alcohol phase, each entering at opposite ends of the system, and the raffinate and extract phases are withdrawn, respectively, at opposite ends of the system. The feed material is introduced at any point in the system. As shown, it is desirably introduced intermediate to the point of introduction of the water and the butyl alcohol phases, thus ensuring the longest contact with each extracting phase before separation. Inasmuch as the feed is merged with the extracting phases by the time extraction is complete, there is no separate point shown for withdrawal of residual feed.

The extraction in accordance with the invention using the initially three-phase fractional counter-current procedures requires appreciably smaller volumes of butyl alcohol, and gives a better separation. Because of the presence of a water phase, in which the non-flavonoid substances are relatively more soluble than in butyl alcohol, the non-flavonoid substances are extracted more completely into the water phase than into the butyl alcohol phase, with the result that appreciably smaller quantities of the non-flavonoid substances are present in the butyl alcohol phase. The desired flavonoid substances, on the other hand, because of their lesser water solubility or water-insolubility, are extracted substantially quantitatively into the butyl alcohol phase. This extraction is the more remarkable because the flavonoid substances in admixture with each other are actually water-soluble. Thus, it is quite unexpected that these substances are not extracted to a substantial extent in the water phase which is present at the same time. Apparently, the striking water-solubility collectively of the mixtures is less strong than their individual solubility in butyl alcohol, so that in its presence the flavonoid substances show their normal solubility characteristics as individual substances. This explanation is hypothetical and has not been confirmed by other evidence. Whatever the reason, the process of the invention gives a better extraction, and a better product.

The extraction is best carried out at a temperature within the range from about 20 to 35° C. The flavonoid substances are more soluble in butyl alcohol at the more elevated temperatures, and thus at the higher temperatures a lesser proportion of butyl alcohol may be used in relation to the feed.

The proportions of butyl alcohol and water to each other and in relation to the feed material are not critical. From 2 to 8 volumes of butyl alcohol to each 0.5 to 3.5 volumes of water per volume of citrus molasses have been found to give satisfactory products. Lesser volumes of solvents would be used with citrus press liquor.

The extraction is essentially complete at the end of three extraction stages in either the batchwise or the continuous procedure, but up to nine stages can be used to ensure complete extraction when the feed material is highly concentrated and contains rather large quantities of the desired flavonoid substances. More extractions also may be necessary where the concentration of flavonoid substances is substantially smaller than the concentration of non-flavonoid substances.

It is apparent that the operating conditions will be largely dependent upon the type and concentration of the feed material, and since this is derived from natural sources it can be enormously variable in composition. Therefore, the best procedure is to determine the relative proportions and concentration of flavonoid and non-flavonoid substances in the feed, and then adjust the extraction temperatures, the solvent ratios and the number of extraction stages accordingly. The composition of the extract phase and the raffinate phase also may vary, depending upon the type and concentration of the feed material, and this will also have to be taken into account.

Using citrus molasses as the feed, a preferred extraction is carried out at a temperature of 20 to 25° C. in three extraction stages in the ratio of 1 volume citrus molasses to 4 volumes of water-saturated n-butyl alcohol to 1.25 volumes of water saturated with n-butyl alcohol, and at these proportions a quantitative extraction is obtainable.

Determination of the biological activity of the product is made by the anti-inflammatory assay of Unger et al. (Am. J. Physiol., 166, 340 (1951)) as modified by French et al. (Prod. Soc. Exptl. Biol. Med., 89, 41 (1955)). Comparison of the product obtained by the extraction process of the invention with the product obtained by lead acetate precipitation in accordance with the procedures in the art clearly demonstrates the superiority of the product obtained by the invention, as shown in the following table:

| Yield | Biological Activity Anti-Inflammatory, Units/g. | Yield of Biological Activity, Units percent |
| --- | --- | --- |
| Lead Acetate, 0.5–1.0% | 2.5 | 1.25–2.5 |
| Process of the Invention, 3.5–4.0% (Product of Example 1) | 5.0 | 17.5–20.0 |

The above results are typical not only of lead acetate but also of the products obtained by heavy metal precipitation processes in general, as has been demonstrated by numerous other comparisons.

The following examples in the opinion of the inventors represent the best embodiments of their invention.

EXAMPLE I

*Batchwise extraction*

Citrus molasses (100 ml., specific gravity 1.34) was adjusted to pH 4 and shaken with 400 ml. of n-butyl alcohol saturated with water and with 125 ml. of water saturated with n-butyl alcohol. The citrus molasses phase disappeared in the course of the shaking, leaving two phases which were separated and carried through fractional countercurrent extraction in three stages as schematically illustrated in Figure 1, using a total of 300 ml. citrus molasses (100 ml. in each stage), 1200 ml. of n-butyl alcohol (400 ml. in each stage) and 375 ml. of water (125 ml. in each stage). The butyl alcohol extracts were combined and concentrated to a syrupy residue under reduced pressure. Water (50 ml.) was added to the residue and stirred until homogeneous. The resulting solution was evaporated to dryness under reduced pressure, to produce 16 g. of a flavonoid complex, a light tan powder completely soluble in water at a concentration of 200 mg. per ml. The product passed all of the chemical tests for flavonoids, showed a characteristic flavonoid ultraviolet absorption spectrum, and had a biological activity of 5.0 anti-inflammatory units per gram.

The above process can be carried out on a commercial scale using suitable mixing and settling tanks with proportionately large amounts of citrus molasses, water and n-butyl alcohol.

EXAMPLE II

*Continuous extraction*

Citrus molasses (4.25 liters, specific gravity 1.34) was brought to pH 4 and extracted in a continuous type Scheibel extraction column by the fractional countercurrent extraction process shown in Fig. 2. The volumes of liquid were maintained at a ratio of 4 volumes n-butyl alcohol saturated with water and 1.25 volumes water saturated with n-butyl alcohol per volume of citrus molasses. The butyl alcohol flowing from the column was reduced to syrup under reduced pressure. Water (700 ml.) was added to the residue, and the mixture stirred until homogeneous. The resulting solution was concentrated under reduced pressure to approximately 30% solids content, after which the residue was removed from the evaporator and dried in a vacuum oven. The yield was 228 g. of flavonoids which passes all the chemical tests for flavonoids, showed a characteristic flavonoid ultraviolet absorption spectrum, and had a biological activity of 5.0 anti-inflammatory units per gram.

EXAMPLE III

Example II was repeated using the press liquor obtained from limed citrus peel and pulp before evaporation. The volume of butyl alcohol was stepped up so that the flow ratio of press liquor to butyl alcohol to water was 1:5:1.25. The butyl alcohol extract was concentrated, diluted with water and dried as in Example II, giving a residue which passes the chemical tests for flavonoids, showed a characteristic flavonoid ultraviolet absorption spectrum, and had a biological activity of 5.0 anti-inflammatory units per gram.

We claim:

1. A process for selectively extracting biologically-active water-soluble complex mixtures of flavonoid substances from plant material containing such substances mixed with non-flavonoid substances, which comprises contacting the material simultaneously with n-butyl alcohol and with water in separate phases, the butyl alcohol phase being saturated with water and the water phase being saturated with butyl alcohol, thereby dissolving the water-soluble flavonoid substances in the butyl alcohol phase and dissolving the non-flavonoid substances in the water phase, and separating the phases.

2. A process in accordance with claim 1, in which the butyl alcohol and water are flowed countercurrently to each other and to the plant material.

3. A process in accordance with claim 1, in which the plant material is citrus waste material.

4. A process in accordance with claim 3, in which the citrus waste is citrus molasses.

5. A process in accordance with claim 3, in which the citrus waste is the press liquor from limed citrus peel and pulp.

6. A process in accordance with claim 1, which includes a multiplicity of batchwise extractions.

7. A process in accordance with claim 1, in which the extraction is carried out countercurrently and continuously.

8. A process in accordance with claim 1, in which the plant material is in the form of an aqueous concentrate.

9. A process in accordance with claim 1, in which the plant material is in the form of an alcoholic concentrate.

10. A process for preparing a stable, nonhygroscopic powered water-soluble complex of flavonoid substances from an impure complex solvated with butyl alcohol, which comprises dissolving the solvated complex in water in sufficient amount to form an azeotrope with substantially all of the butyl alcohol, and azeotropically distilling water and butyl alcohol until substantially all of the butyl alcohol and water have been removed.

11. The water soluble complex flavonoid product obtained by the process of claim 1.

12. The water-soluble complex flavonoid product obtained by the process of claim 10.

No references cited.